(12) United States Patent
Pallakoff

(10) Patent No.: US 11,887,601 B2
(45) Date of Patent: *Jan. 30, 2024

(54) SYSTEMS, METHODS, AND STORAGE MEDIA FOR PROVIDING PRESENCE OF MODIFICATIONS IN USER DICTATION

(71) Applicant: Suki AI, Inc., Redwood City, CA (US)

(72) Inventor: Matt Pallakoff, Redwood City, CA (US)

(73) Assignee: Suki AI, Inc., Redwood City, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/697,906

(22) Filed: Mar. 17, 2022

(65) Prior Publication Data

US 2022/0208195 A1 Jun. 30, 2022

Related U.S. Application Data

(63) Continuation of application No. 16/799,330, filed on Feb. 24, 2020, now Pat. No. 11,328,729.

(51) Int. Cl.
*G10L 15/22* (2006.01)
*G10L 15/26* (2006.01)
*G10L 15/01* (2013.01)
*G06F 3/16* (2006.01)
(Continued)

(52) U.S. Cl.
CPC ............... *G10L 15/26* (2013.01); *G06F 3/16* (2013.01); *G06F 18/2178* (2023.01); *G10L 13/08* (2013.01); *G10L 15/01* (2013.01); *G10L 15/22* (2013.01)

(58) Field of Classification Search
CPC ......... G10L 15/22; G10L 15/26; G10L 15/30; G10L 2015/223; G10L 13/02; G10L 13/08; G10L 15/01; G10L 5/063; G10L 15/18; G10L 15/1815; G10L 15/1822;
(Continued)

(56) References Cited

U.S. PATENT DOCUMENTS 7,647,225 B2 * 1/2010 Bennett .................. G10L 15/30
704/270.1
7,693,717 B2 * 4/2010 Kahn ...................... G10L 15/22
704/278

(Continued)

*Primary Examiner* — Vijay B Chawan
(74) *Attorney, Agent, or Firm* — Esplin & Associates, PC

(57) ABSTRACT

System and method for providing presence of modifications in user dictation are disclosed. Exemplary implementations may: obtain primary audio information representing sound, including speech from a recording user, captured by a client computing platform; perform speech recognition on the primary audio information to generate a textual transcript; effectuate presentation of the transcript to the recording user; receive user input from the recording user; alter, based on the received user input from the recording user, a portion of the transcript to generate an altered transcript; effectuate presentation of the altered transcript in conjunction with audio playback of at least some of the primary audio information in a reviewing interface on a client computing platform; receive user input from the reviewing user; alter, based on the received user input from the reviewing user, portions of the altered transcript to generate a reviewed transcript; and store the reviewed transcript in electronic storage.

20 Claims, 6 Drawing Sheets

(51) Int. Cl.
*G10L 13/08* (2013.01)
*G06F 18/21* (2023.01)

(58) Field of Classification Search
CPC .......... G06F 3/16; G06F 40/166; G06F 3/167; G06F 16/685; G06F 40/169; G06F 40/232
See application file for complete search history.

(56) References Cited

U.S. PATENT DOCUMENTS

| | | | | |
|---|---|---|---|---|
| 8,433,574 | B2 * | 4/2013 | Jablokov | G10L 13/00 704/260 |
| 8,595,620 | B2 * | 11/2013 | Larsen | G16H 10/60 715/254 |
| 10,733,993 | B2 * | 8/2020 | Kudurshian | G10L 15/1815 |
| 10,748,529 | B1 * | 8/2020 | Milden | G06F 3/167 |
| 11,037,565 | B2 * | 6/2021 | Kudurshian | G06F 16/685 |
| 11,328,729 | B1 * | 5/2022 | Pallakoff | G10L 13/08 |
| 11,562,744 | B1 * | 1/2023 | Gao | G10L 15/26 |
| 2003/0233237 | A1 * | 12/2003 | Garside | G06F 3/038 704/E15.045 |
| 2004/0225499 | A1 * | 11/2004 | Wang | G10L 15/26 704/E15.044 |
| 2010/0017694 | A1 * | 1/2010 | Wick | G06F 40/169 715/201 |
| 2011/0078570 | A1 * | 3/2011 | Larsen | G16H 10/60 715/710 |
| 2013/0018655 | A1 * | 1/2013 | Terrell, II | G10L 15/26 704/235 |
| 2014/0019128 | A1 * | 1/2014 | Riskin | G16H 10/60 704/235 |
| 2014/0047327 | A1 * | 2/2014 | Larsen | G16H 10/60 715/255 |
| 2017/0263248 | A1 * | 9/2017 | Gruber | G10L 15/02 |
| 2021/0117214 | A1 * | 4/2021 | Presant | H04L 67/535 |

\* cited by examiner

SYSTEMS, METHODS, AND STORAGE MEDIA FOR PROVIDING PRESENCE OF MODIFICATIONS IN USER DICTATION

FIELD OF THE DISCLOSURE

The present disclosure relates to systems, methods, and storage media for providing presence of modifications in user dictation.

BACKGROUND

Healthcare personnel (e.g., doctors, physician assistants, nurses, etc.) and other professionals may utilize speech recognition platforms to dictate, transcribe, and generate notes. The generated notes may contain errors (e.g., incorrect transcriptions and/or user-made errors) and review teams of one or more persons may correct the errors.

SUMMARY

One aspect of the present disclosure relates to communicating presence of modifications in text generated from user dictation. Such communication may be accomplished in a reviewing interface that presents a transcript of a user dictation for review. A reviewer may review the transcript along with audio playback of the user dictation to ensure the dictation was accomplished with precision and/or accuracy. The reviewing interface may visually indicate portions of the transcript that have previously been corrected (i.e., prior to review by the reviewer), for example by the user making the user dictation (e.g., a recording user). Such presentation of modifications in the transcript made by the recording user may enhance one or more aspects of the review by the reviewing user. Such aspects may include, for example, one or more of accuracy, speed, efficiency, and/or other aspects.

A system configured to provide modifications in user dictation may include one or more hardware processors, client computing platforms, and/or other components. The one or more hardware processors may be configured to communicate with the client computing platforms via a network. The individual client computing platforms may include a user interface and an audio section configured to receive input from a recording user associated with an individual client computing platform, from a reviewing user associated with an individual client computing platform, and/or other users. The individual client computing platform associated with the reviewing user may include a reviewing interface that may be configured to receive user input from the reviewing user associated with the individual client computing platform.

In some implementations, the one or more processors may be configured by machine-readable instructions. The machine-readable instructions may include one or more computer program components. The computer program components may include one or more of an information component, speech component, presentation component, modification component, transcript storing component, and/or other components.

The information component may be configured to obtain primary audio information representing sound captured by a client computing platform associated with the recording user. Such sound may include speech from the recording user and/or other users. The information component may be configured to receive, via the client computing platform associated with the recording user, user input from the recording user. The information component may be configured to receive, via the reviewing interface, user input from the reviewing user. The user inputs may include instructions to alter one or more portions of the transcript or altered transcript.

The speech component may be configured to perform speech recognition on the primary audio information such that a textual transcript representing the speech from the recording user in the primary audio information is generated. The speech component may be configured to perform speech synthesis on the user input from the recording user that is textual input to generate synthetic audio information.

The modification component may be configured to alter the portion of the transcript to generate an altered transcript based on the received user input from the recording user. The modification component may be configured to alter the one or more portions of the altered transcript to generate a reviewed transcript based on the received user input from the reviewing user.

The modification component may be configured to replace a portion of the primary audio information with the synthetic audio information. The modification component may be configured to replace a portion of the primary audio information with alternative audio information from the recording user.

The presentation component may be configured to effectuate presentation of the transcript to the recording user on the client computing platform. The presentation component may be configured to effectuate presentation of the altered transcript in conjunction with audio playback of at least some of the primary audio information in the reviewing interface. Presentation of the altered transcript in the reviewing interface may include visually indicating the corrected portion of the altered transcript. The reviewing user may check the accuracy of the altered transcript with the primary audio information played back in conjunction with presentation of the altered transcript.

The storing transcript component may be configured to store the reviewed transcript in electronic storage media.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
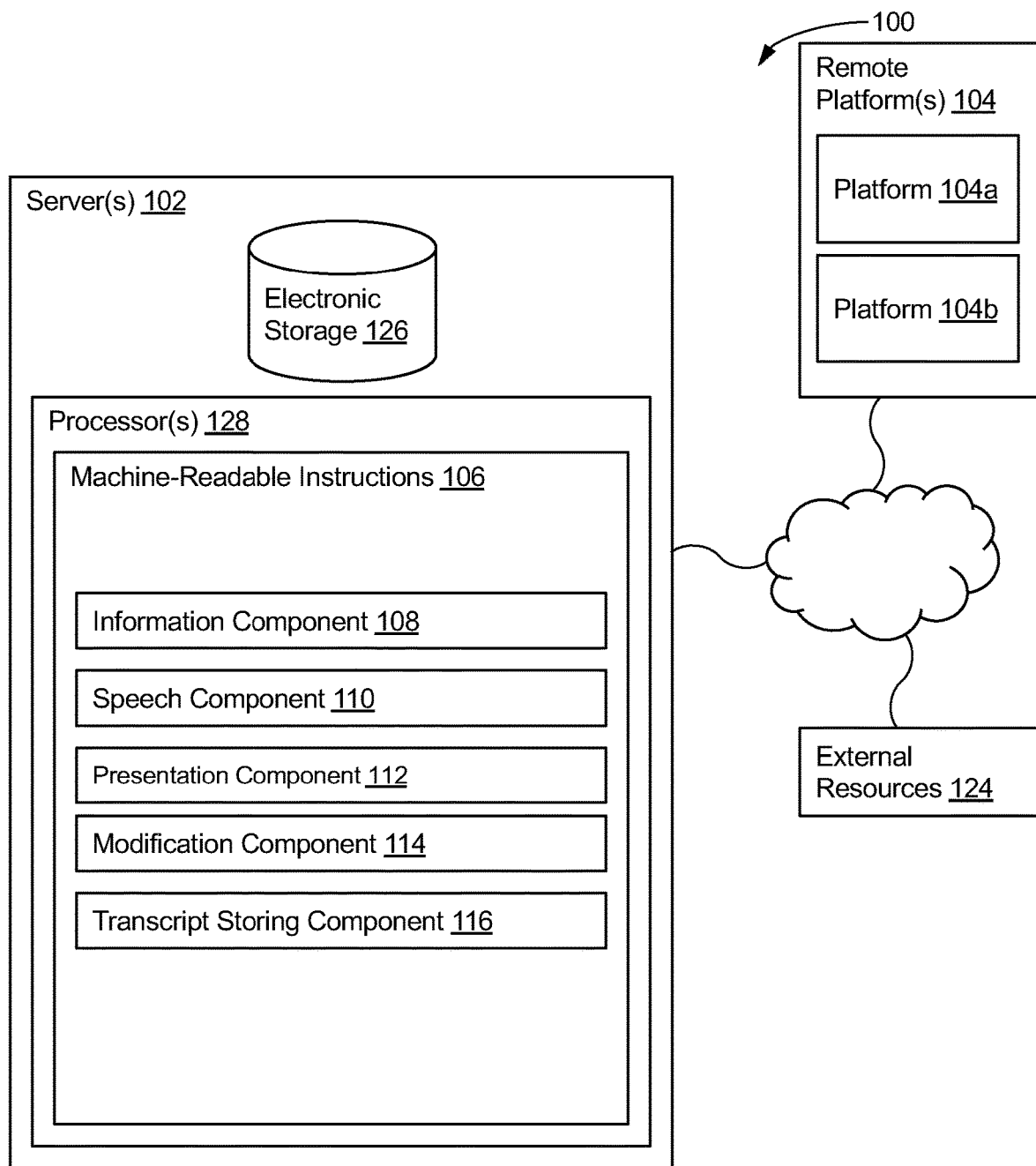
FIG. 1 illustrates a system configured for providing presence of modifications in user dictation, in accordance with one or more implementations.

FIG. 1 illustrates a system 100 configured for providing presence of modifications in user dictation, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of information component 108, speech component 110, presentation component 112, modification component 114, transcript storing component 116, and/or other instruction components.

Information component 108 may be configured to obtain primary audio information representing sound captured by a client computing platform 104a. Information component 108 may obtain the primary audio information via one or more of a network, portable electronic storage, point-to-point electronic communication, and/or via other communication mechanisms. Such sound may include speech from a recording user associated with client computing platform 104a. The speech may be transcribed and recorded (e.g., via analog or digital recording) by client computing platform 104a. The speech from the recording user may, by way of non-limiting example, be information related to a medical appointment, a meeting, a lecture, a presentation, and/or other instances where speech dictation may be transcribed and stored. The recording user may, by way of non-limiting example, include a doctor, nurse, healthcare personnel, lecturer, another caregiver, and/or other recording users.

The client computing platform 104a may be configured to communicate with one or more processors (e.g., processors 128) via the network. The client computing platform 104a may include a user interface and an audio section configured to receive input from the recording user associated with client computing platform 104a. The audio section may include one or more of a microphone, an audio encoder, a storage, a speaker, and/or a processor.

The microphone may be configured to detect the sounds represented by the primary audio information and/or other audio information. The microphone may include a single sound sensor or an array of sound sensors. The one or more microphones may be discreet microphones, prominent microphones, array microphones, and/or other microphones. The sound sensor(s) may be configured to convert of the sounds represented by the audio information to digital signals. Converting the sounds represented by the audio information may include converting analog waves to digital signals by precisely measuring the analog waves at consistent and frequent intervals. The digital signals may include noise that is unwanted. The sound sensor(s) may be configured to filter the digital signals of the noise.

The audio encoder may encode the digital signals to an audio file according to an audio file format such that the digital signals are compressed. By way of non-limiting example, the audio file format may include apple lossless audio, True Audio (TTA), Free Lossless Audio Code (FLAC), Moving Picture Experts Group Layer-3 (MP3), Advanced Audio Coding (AAC), Waveform Audio File Format (WAV), and/or other audio file formats. The audio encoder may encode the digital signals to the audio file always, never, for each session of use, when the audio information is determined to have more noise than signal in a signal-to-noise ratio (SNR), when configured to store the audio file, and/or other terms. By way of non-limiting example, sessions may include a patient visit, a meeting, a call, and/or other sessions. SNR may be defined as the ratio between signal and noise in which an audio file has more signal than noise with a high SNR.

The storage of the audio section may be configured to store the audio file. The audio file may be stored on client computing platform 104a, electronic storage 126, and/or other storage media. The audio file may be stored in one of the audio file formats. Each audio file of audio information may be stored always, never, for each session of use, when the audio information is determined to have more noise than signal in a signal-to-noise ratio (SNR), and/or other terms. Upon storage, the audio file may be stored for a specified period of time. The specified period of time may include a day, a week, a month, a year, until manually deleted, until storage is full, and/or other specified periods of time.

Functions of the audio encoder of the audio section and/or the storage of the audio section may be effectuated by one or more processors of the audio section.

Speech component 110 may be configured to perform speech recognition on the primary audio information. The performance of speech recognition may enable a textual transcript representing the speech from the recording user in the primary audio information to be generated. Speech recognition may be performed by various known speech recognition software.

Presentation component 112 may be configured to effectuate presentation of the transcript to the recording user. The effectuation of presentation of the transcript may be via the user interface of client computing platform 104a. Subsequent to presentation, one or more portions of the transcript by be altered by way of user input from the recording user or may not be altered such that the transcript remains as is during presentation to a reviewing user and/or other users.

Figure 6:
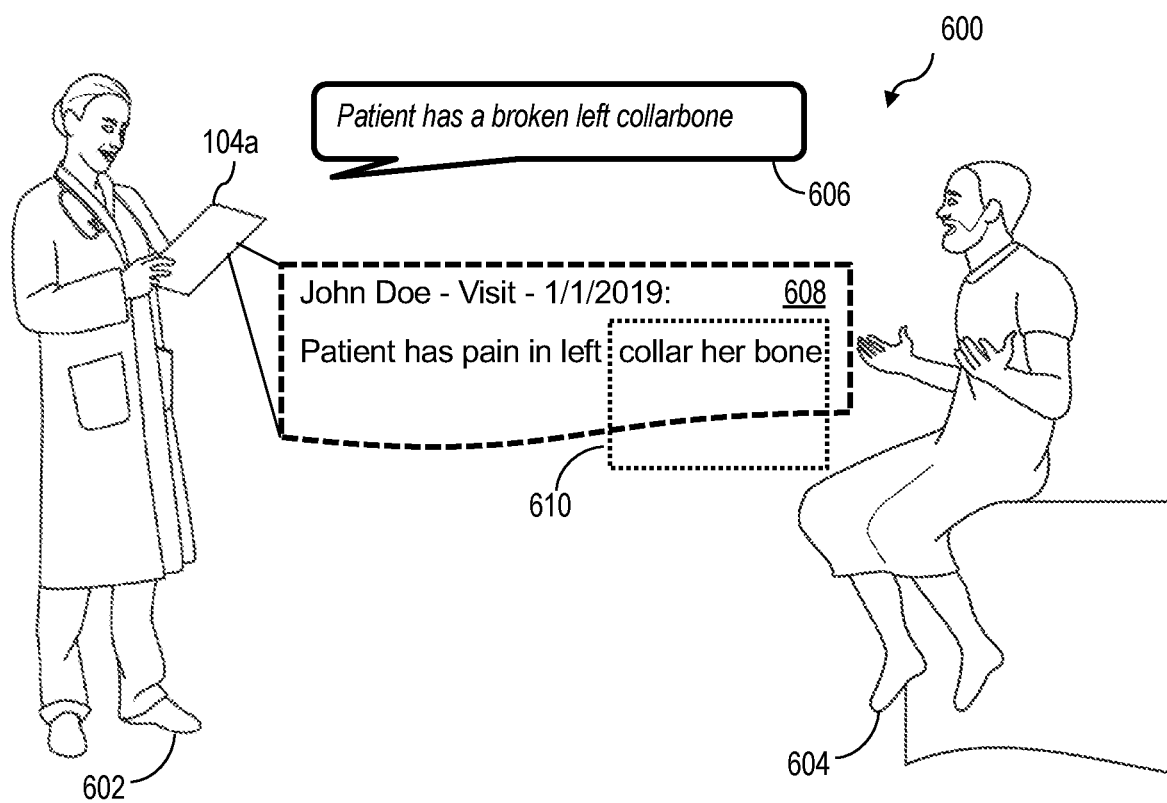
FIG. 6 illustrates an example implementation of the system configured for providing presence of modifications in user dictation, in accordance with one or more implementations.
Figure 6:
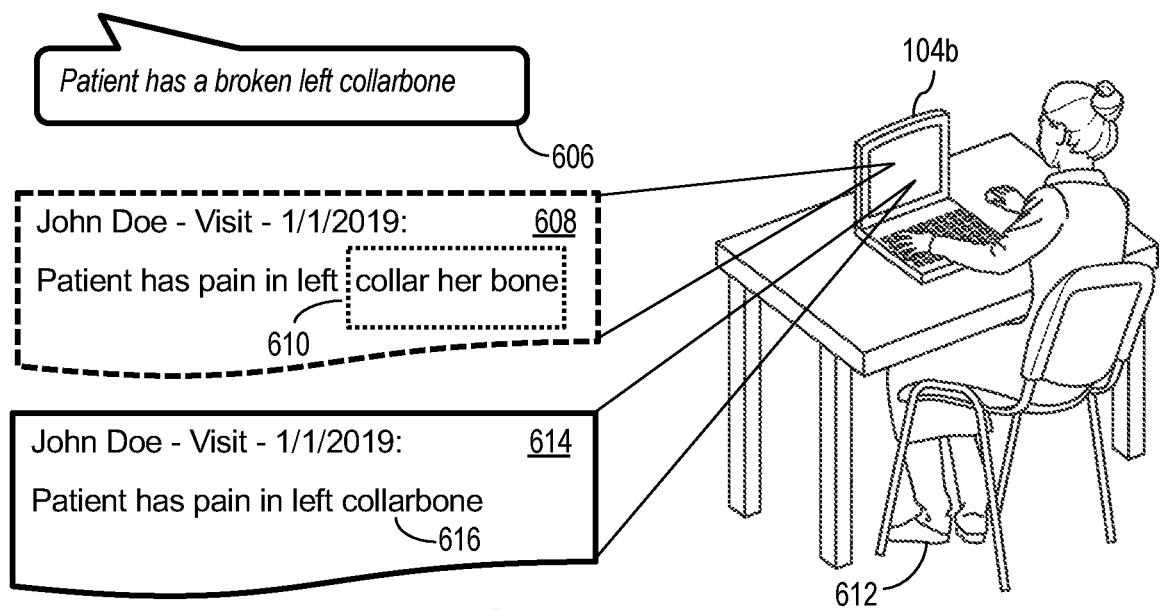

FIG. 6 illustrates an example implementation of the system configured for providing presence of modifications in user dictation, in accordance with one or more implementations. FIG. 6 may illustrate scenario 600 including recording information during an appointment and interfaces presenting the information. Scenario 600 may include doctor 602 (i.e., the recording user), patient 604, and reviewer 612. Doctor 602 may determine patient 604 has a broken left collarbone. Doctor 602 may dictate audio 606 into tablet 104a. Based on audio 606, transcript 608 may be generated mistakenly interpreting "collarbone" as "call her bone" and thus include incorrect transcription 610. Upon presentation of transcript 608 on tablet 104*a*, doctor 602 may fail to notice incorrect transcription 610 such that no altered transcript is generated. Audio 606 and transcript 608 may be presented to reviewer 612 via laptop 104*b*. Based on audio 606, reviewer 612 may cause alteration 616, via laptop 104*b*, to generate reviewed transcript 614, thus correcting incorrect transcription 610.

Referring back to FIG. 1, information component 108 may be configured to receive the user input from the recording user. Information component 108 may be configured to receive via client computing platform 104*a*. The user input from the recording user may include instructions to alter a portion of the transcript. The portion of the transcript may represent a portion of the speech from the recording user in the primary audio information. The instruction to alter the portion of the transcript may create a corrected portion of the transcript. The corrected portion of the transcript may be visually indicated when presented to the reviewing user and/or other users. The visual indications may be selected by the recording user (e.g., the recording user highlights the corrected portion), predetermined (e.g., corrected portion is automatically struck through), interchangeable (i.e., users can modify the predetermined strikethrough of corrected portions with change in font color instead), and/or selected in other ways.

Modification component 114 may be configured to alter the portion of the transcript to generate an altered transcript. The alteration may be based on the received user input from the recording user. The altered transcript may include the corrected portion of the transcript created by the user input from the recording user and uncorrected portions of the transcript.

In some implementations, the user input from the recording user that may contribute to generation of the altered transcript may include alternative audio information representing sound captured by client computing platform 104*a*. The alternative audio information may include re-dictated speech from the recording user to replace a portion of the primary audio information that is represented by the corrected portion of the transcript. The corrected portion of the transcript that the alternative audio information represents may be visually indicated.

Figure 3:
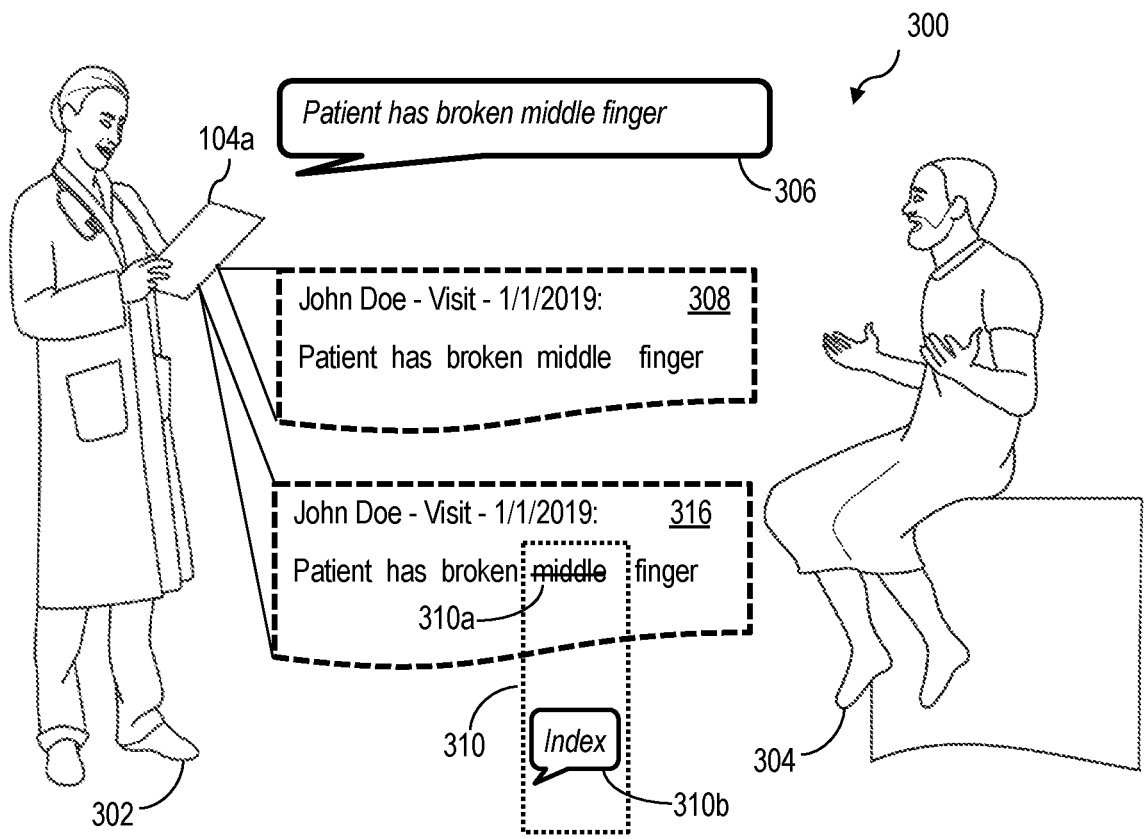
FIG. 3 illustrates an example implementation of the system configured for providing presence of modifications in user dictation, in accordance with one or more implementations.
Figure 3:
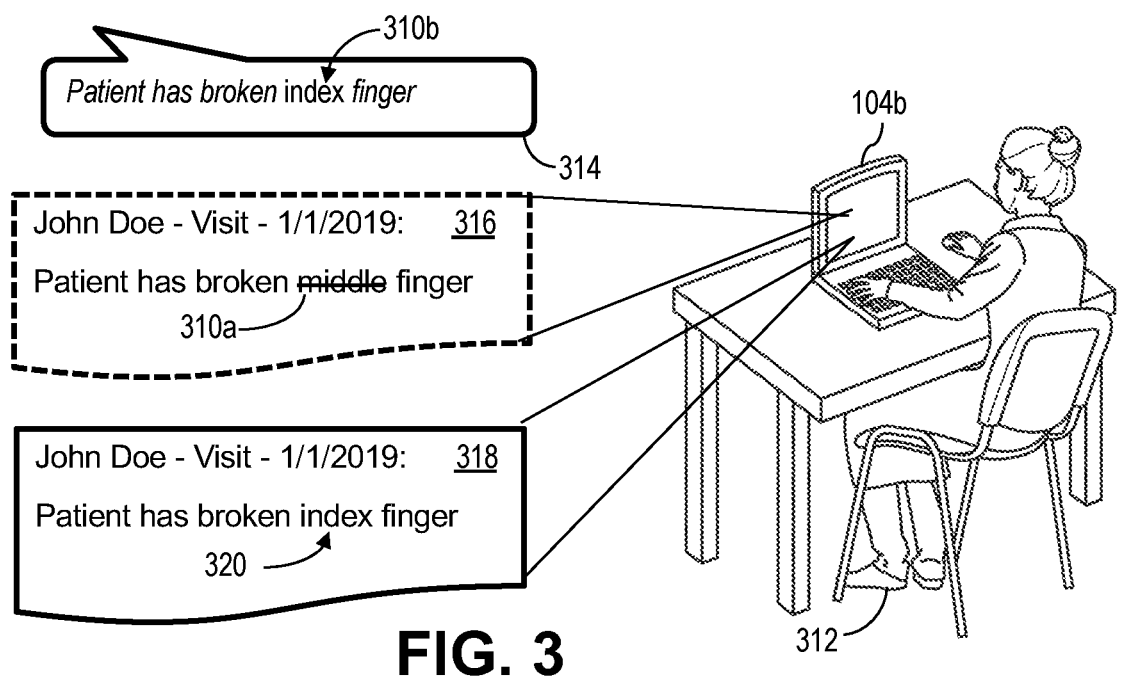

FIG. 3 illustrates an example implementation of the system configured for providing presence of modifications in user dictation, in accordance with one or more implementations. FIG. 3 may illustrate scenario 300 including recording information during an appointment and interfaces presenting the information. Scenario 300 may include doctor 302 (i.e., the recording user), patient 304, and reviewer 312. Doctor 302 may determine patient 304 has a broken index finger. Doctor 302 may, mistakenly, dictate audio 306 into tablet 104*a*, stating "middle" instead of "index" finger. Based on audio 306, transcript 308 may be generated. Upon presentation of transcript 308 on tablet 104*a*, doctor 302 may cause alteration 310. Alteration 310 may include strikethrough 310*a* to visually indicate an alteration to the word "middle" and re-dictation 310*b* in replacement. Based on alteration 310, altered transcript 316 may be generated.

Referring back to FIG. 1, in some implementations, the user input from the recording user that may contribute to generation of the altered transcript includes textual input to client computing platform 104*a* by the recording user. The textual input may be input via the user interface (e.g., keyboard, touchscreen, remote, etc.) of client computing platform 104*a*.

Figure 5:
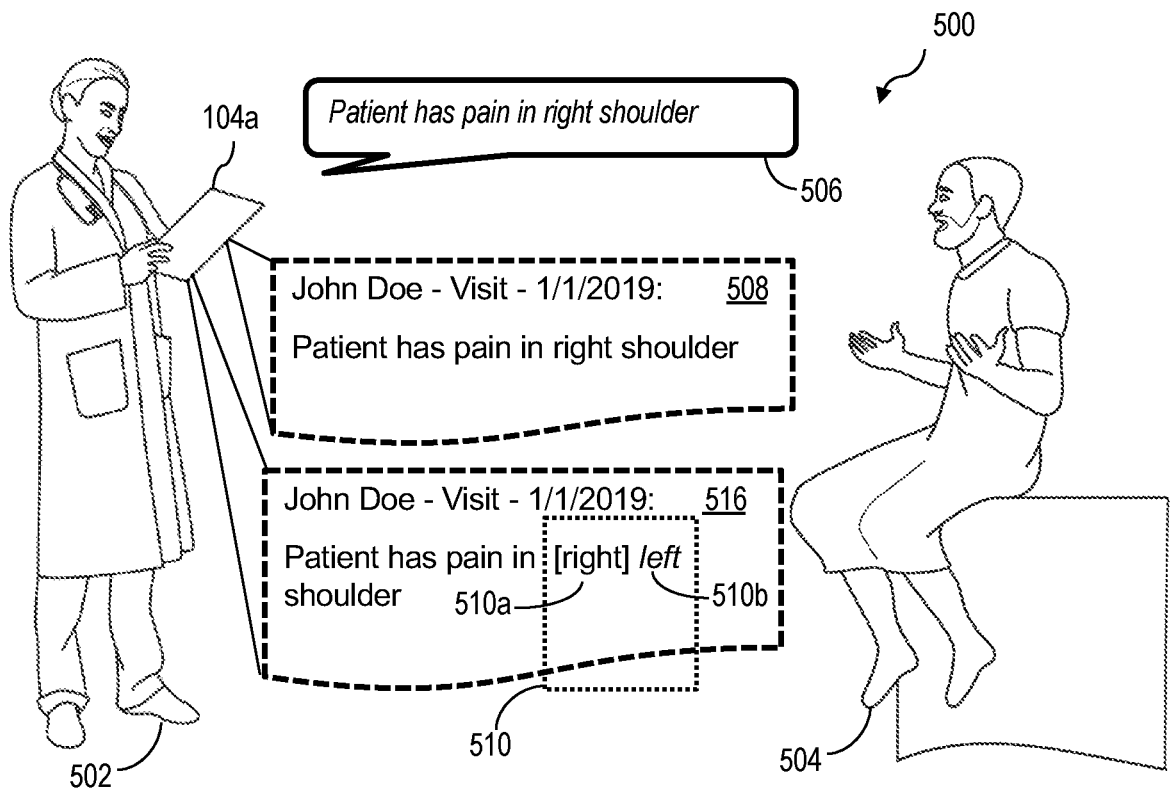
FIG. 5 illustrates an example implementation of the system configured for providing presence of modifications in user dictation, in accordance with one or more implementations.
Figure 5:
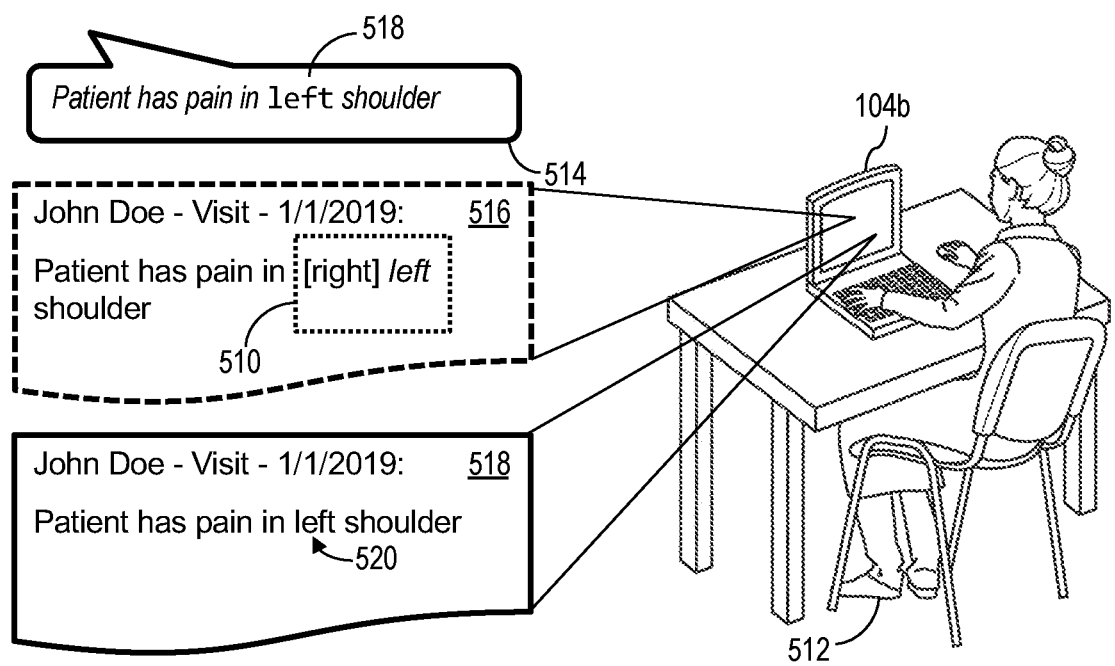

FIG. 5 illustrates an example implementation of the system configured for providing presence of modifications in user dictation, in accordance with one or more implementations. FIG. 5 may illustrate scenario 500 including recording information during an appointment and interfaces presenting the information. Scenario 500 may include doctor 502 (i.e., the recording user), patient 504, and reviewer 512. Doctor 502 may determine patient 504 has left shoulder pain. Doctor 502 may, mistakenly, dictate audio 506 into tablet 104*a*, stating "right" instead of "left" shoulder. Based on audio 506, transcript 508 may be generated. Upon presentation of transcript 508 on tablet 104*a*, doctor 502 may cause alteration 510. Alteration 510 may include brackets 510*a* to visually indicate an alteration to the word "right" and textual input 510*b* in replacement. Based on alteration 510, altered transcript 516 may be generated and include alteration 510.

Referring back to FIG. 1, presentation component 112 may be configured to effectuate presentation of the altered transcript in conjunction with audio playback of at least some of the primary audio information. The effectuation of presentation may be via information transmitted over the network. The presentation may be in a reviewing interface of client computing platform 104*b*. Presentation of the altered transcript in the reviewing interface may include visually indicating the corrected portion of the altered transcript. The corrected portion of the transcript may be visually indicated by, by way of non-limiting example, one or more of highlight, bold, italics, color, strikethrough, underline, brackets, curly brackets, parenthesis, asterisks, forward slash, backward slash, quotation marks, tilde, dash, underscore, and/or other visual indicators.

The reviewing interface may be configured to receive the user input from a reviewing user. The reviewing user may check the accuracy of the altered transcript with the at least some of the primary audio information played back in conjunction with presentation of the altered transcript. Accuracy of the altered transcript may represent that the primary audio information and/or other audio information accord with the transcript or altered transcript. The at least some of the primary audio information may be played back in conjunction with the presentation of the altered transcript such that the primary audio information may be played back by the reviewing user contemporaneously with viewing the altered transcript to check the accuracy of the altered transcript.

In some implementations, the visual indications of the textual input from the recording user may take precedence over the primary audio information (e.g., no secondary audio information to play back) and indicate to the reviewing user that the corrected portions of the altered transcript need minor alterations (e.g., fix spelling and/or grammar) or no further alterations. Presentation component 112 may be configured to effectuate presentation of the altered transcript in conjunction with audio playback of the primary audio information in its entirety. The effectuation of presentation may be via the reviewing interface. As such, when the reviewing user is utilizing the playback of the primary audio information in conjunction with the presentation of the altered transcript to check the accuracy of the altered transcript, the primary audio information may not accord. Therefore, the reviewing user may make no further alterations to the altered transcript or minor alterations (e.g., fix spelling and/or grammar).

Figure 4:
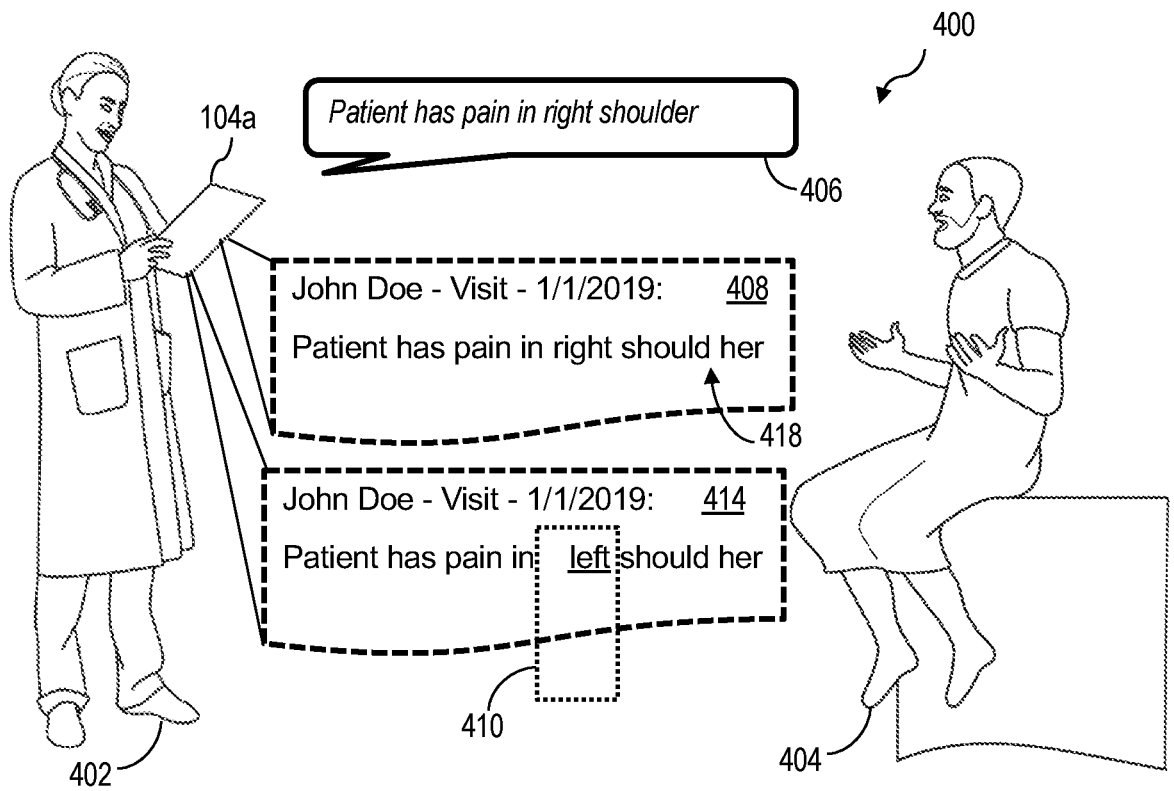
FIG. 4 illustrates an example implementation of the system configured for providing presence of modifications in user dictation, in accordance with one or more implementations.
Figure 4:
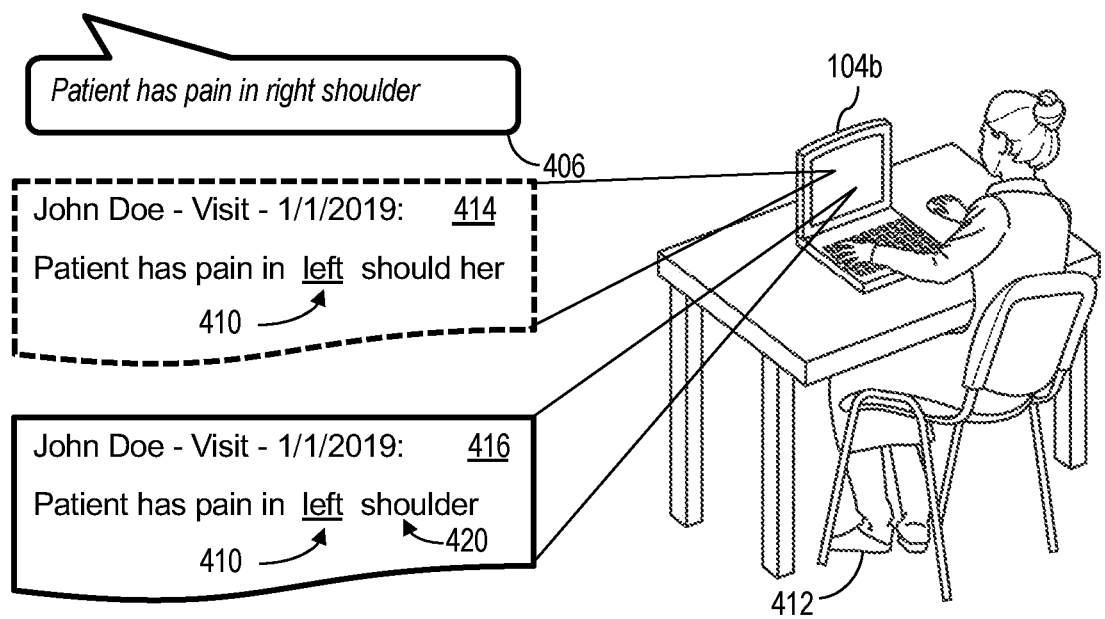

FIG. 4 illustrates an example implementation of the system configured for providing presence of modifications in user dictation, in accordance with one or more implementations. FIG. 4 may illustrate scenario 400 including recording information during an appointment and interfaces presenting the information. Scenario 400 may include doctor 402 (i.e., the recording user), patient 404, and reviewer 412. Doctor 402 may determine patient 404 has left shoulder pain. Doctor 402 may, mistakenly, dictate audio 406 into tablet 104a, stating "right" instead of "left" shoulder. Based on audio 406, transcript 408 may be generated. Transcript 408 may include the misspoken shoulder side and incorrect transcription 418 for "shoulder". Upon presentation of transcript 408 on tablet 104a, doctor 402 may cause alteration 410. Alteration 410 may include deletion of the word "right" and underlined textual input of "left" in replacement. Based on alteration 410, altered transcript 414 may be generated and include alteration 410. Audio 406 and altered transcript 414 may be presented to reviewer 412 via laptop 104b. Although audio 406 does not coincide with altered transcript 414, reviewer 412 may allow alteration 410 from doctor 402 in reviewed transcript 416.

Referring back to FIG. 1, in some implementations, modification component 114 may be configured to replace the portion of the primary audio information that is represented by the corrected portion of the transcript with the alternative audio information to generate secondary audio information. As mentioned above, the alternative audio information may include re-dictated speech from the recording user. The secondary audio information may include intertwined portions of the primary audio information and the alternative audio information such that the secondary audio information audibly reflects modifications made by the recording user. As such, the effectuation of presentation of the altered transcript in conjunction with audio playback of at least some of the primary audio information in the reviewing interface on client computing platform 104b may include effectuating audio playback of the secondary audio information in conjunction with presentation of the altered transcript through the reviewing interface.

Continuing illustration of FIG. 3, based on alteration 310, audio 314 may be generated. Audio 314 may include re-dictation 310b and portions of audio 306. Altered transcript 316 may include alteration 310a. Audio 314 and altered transcript 316 may be presented to reviewer 312 via laptop 104b.

Referring back to FIG. 1, in some implementations, speech component 110 may be configured to perform speech synthesis on the textual input received. The textual input received may be from the recording user and/or other users. The performance of speech synthesis may generate synthetic audio information that represents the textual input from the recording user. The synthetic audio information may include synthetic sounds (e.g., robotic) and/or pre-recorded voices.

Modification component 114 may be configured to replace the portion of the primary audio information that is represented by the corrected portion of the transcript with the synthetic audio information to generate secondary audio information. In this implementation, the secondary audio information may include intertwined portions of the primary audio information and the synthetic audio information to audibly reflect modifications made by the recording user. As such, effectuating presentation of the altered transcript in conjunction with audio playback of at least some of the primary audio information in the reviewing interface on client computing platform 104b may include effectuating audio playback of the secondary audio information in conjunction with presentation of the altered transcript through the reviewing interface.

Continuing illustration of FIG. 5, based on alteration 510, audio 514 may be generated. Speech synthesis may be performed on textual input 510b such that audio 514 may include synthetic audio 518 (e.g., robotic voice) and portions of audio 506 (i.e., voice of doctor 502). Altered transcript 516 may include alteration 510. Audio 514 and altered transcript 516 may be presented to reviewer 512 via laptop 104b.

Referring back to FIG. 1, information component 108 may be configured to receive user input from the reviewing user. Information component 108 may be configured to receive the user input from the reviewing user via the reviewing interface of client computing platform 104b. The user input from the reviewing user may include instructions to further alter one or more portions of the altered transcript. Receiving, via the reviewing interface, the user input from the reviewing user may include receiving textual input. In some implementations, the reviewing interface may not facilitate auditory input by the reviewing user. The textual input from the reviewing user may be to correct one or more portions of the transcript and/or the altered transcript to ensure accuracy of the transcript and/or the altered transcript in accordance with at least some of the primary audio information, the secondary audio information, and/or other audio information.

Modification component 114 may be configured to alter the one or more portions of the altered transcript to generate a reviewed transcript. The alteration may be based on the received user input from the reviewing user. The reviewed transcript may be a version of the transcript that had been altered by the recording user and the reviewing user.

Concluding illustration of FIG. 4, reviewer 412 may cause alteration 420 to correct incorrect transcription 418 and cause alteration 410 to remain. Thus, reviewed transcript 416 may be generated and include alterations 410 and 420. In some implementations, reviewer 412 causing alteration 410 to remain may include remove the underline (i.e., the visual indicator).

Concluding illustration of FIG. 3, reviewer 312 may cause alteration 320, via laptop 104b, to generate reviewed transcript 318 such that "middle" with is replaced "index" by reviewer 312.

Concluding illustration of FIG. 5, based on the coinciding audio 514 and altered transcript 516, reviewer 512 may cause alteration 520, via laptop 104b, to delete "right" and allow alteration 510 made by doctor 502 such that reviewed transcript 518 is generated.

Referring back to FIG. 1, transcript storing component 116 may be configured to store the reviewed transcript in electronic storage 126. Upon storage, the reviewed transcript may be stored for a specified period of time. The specified period of time may include a day, a week, a month, a year, until manually deleted, until storage is full, and/or other specified periods of time. The reviewed transcript may be subsequently retrieved for viewing, editing, exporting, printing, e-mailing, transferring, and/or other functions as permitted by users (e.g., the recording user, the reviewing user, a supervisor, other personnel, etc.).

Presentation component 112 may be configured to effectuate presentation of the reviewed transcript to the recording user. The effectuation of presentation may be via client computing platform 104a and/or other client computing platform 104 in response to a retrieval of the reviewed transcript.

In some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, mobile computing platform, a tablet computing platform, a touchscreen computing platform, a NetBook, a Smartphone, a gaming console, and/or other computing platforms. Such client computing platform(s) 104 may include one or more discreet microphones, prominent microphones, projected displays, touchscreen monitors with built-in microphones, and/or other features.

By way of non-limiting example, the recording user may interface with system 100 via discreet microphones positioned on desks and/or walls of a room by which the recording user may openly speak such that the user input from the recording user may be received. Simultaneously, the recording user may view presentation of the transcript on a display presented on a wall of the room.

By way of non-limiting example, the recording user may interface with system 100 via a wall-mounted touchscreen monitor enabled with build-in microphones such that the recording user may provide textual input and/or auditory input.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 108, 110, 112, 114, and/or 116, and/or other components. Processor(s) 128 may be configured to execute components 108, 110, 112, 114, and/or 116, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 128 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 128 may be configured to execute one or more additional components that may perform some or all of the functionality attributed below to one of components 108, 110, 112, 114, and/or 116.

Figure 2:
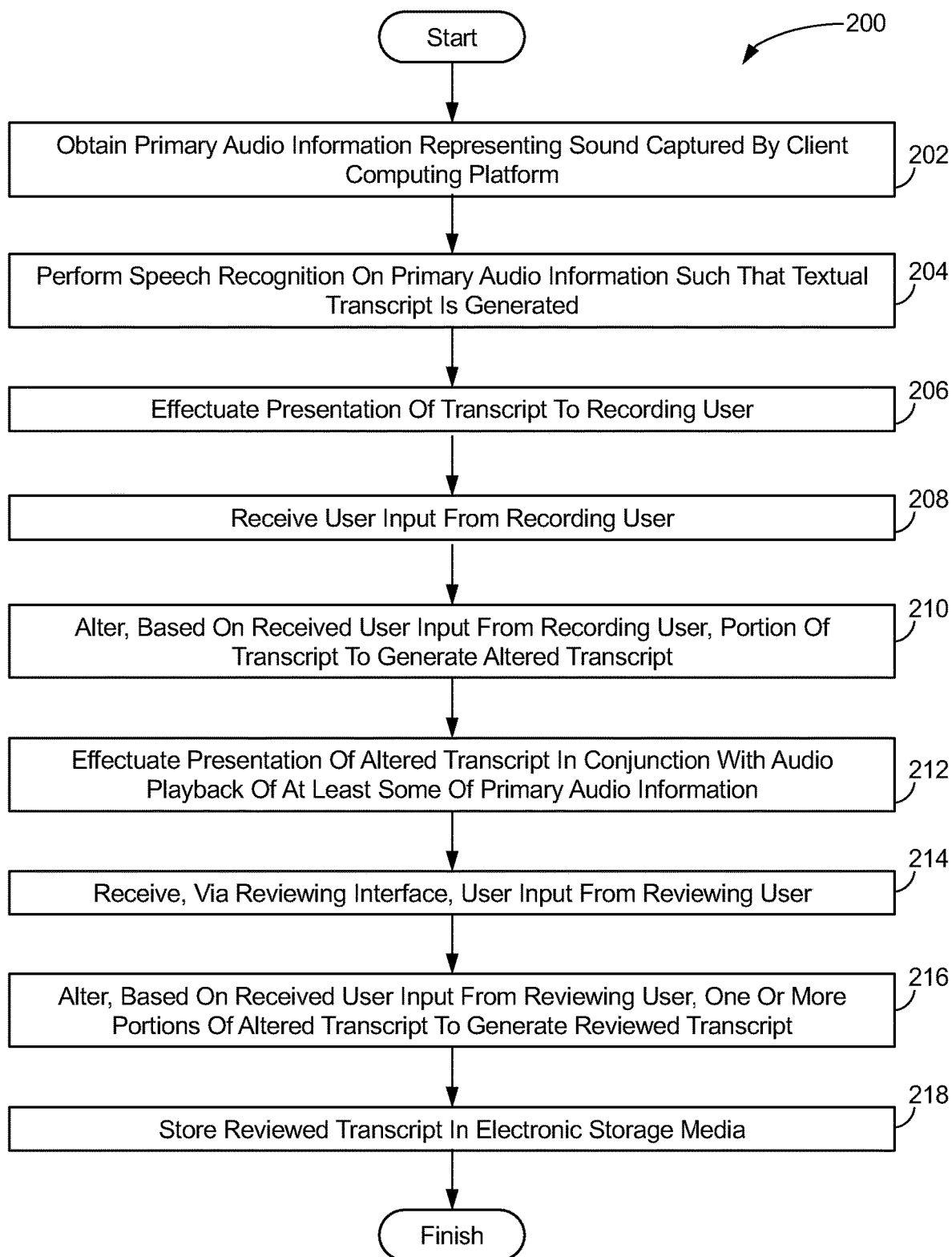
FIG. 2 illustrates a method for providing presence of modifications in user dictation, in accordance with one or more implementations.

FIG. 2 illustrates a method 200 for providing presence of modifications in user dictation, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining primary audio information representing sound captured by a client computing platform. Such sound including speech from a recording user associated with the client computing platform. Operation 202 may be performed by one or more hardware processors configured by machine-readable instructions including a component that is the same as or similar to information component 108, in accordance with one or more implementations.

An operation 204 may include performing speech recognition on the primary audio information such that a textual transcript representing the speech from the recording user in the primary audio information is generated. Operation 204 may be performed by one or more hardware processors configured by machine-readable instructions including a component that is the same as or similar to speech component 110, in accordance with one or more implementations.

An operation 206 may include effectuating presentation of the transcript to the recording user. Presentation may be via the user interface of the client computing platform. Operation 206 may be performed by one or more hardware processors configured by machine-readable instructions including a component that is the same as or similar to presentation component 112, in accordance with one or more implementations.

An operation 208 may include receiving user input from the recording user. The user input from the recording user may be received via the client computing platform associated with the recording user. The user input from the recording user may include instructions to alter a portion of the transcript that represents a portion of the speech from the recording user in the primary audio information to create a corrected portion of the transcript. Operation 208 may be performed by one or more hardware processors configured by machine-readable instructions including a component that is the same as or similar to information component 108, in accordance with one or more implementations.

An operation 210 may include altering the portion of the transcript to generate an altered transcript. The alteration may be based on the received user input from the recording user. Operation 210 may be performed by one or more hardware processors configured by machine-readable instructions including a component that is the same as or similar to modification component 114, in accordance with one or more implementations.

An operation 212 may include effectuating presentation of the altered transcript in conjunction with audio playback of at least some of the primary audio information in a reviewing interface on a client computing platform. Presentation of the altered transcript in the reviewing interface may include visually indicating the corrected portion of the altered transcript. The reviewing interface may be configured to receive user input from a reviewing user checking the accuracy of the altered transcript with the primary audio information played back in conjunction with presentation of the altered transcript. Operation 212 may be performed by one or more hardware processors configured by machine-readable instructions including a component that is the same as or similar to presentation component 112, in accordance with one or more implementations.

An operation 214 may include receiving user input from the reviewing user. The user input from the reviewing user may include instructions to further alter one or more portions of the altered transcript. The user input from the reviewing user may be received via the reviewing interface. Operation 214 may be performed by one or more hardware processors configured by machine-readable instructions including a component that is the same as or similar to information component 108, in accordance with one or more implementations.

An operation 216 may include altering the one or more portions of the altered transcript to generate a reviewed transcript. The alteration may be based on the received user input from the reviewing user. Operation 216 may be performed by one or more hardware processors configured by machine-readable instructions including a component that is the same as or similar to modification component 114, in accordance with one or more implementations.

An operation 218 may include storing the reviewed transcript in electronic storage media. Operation 218 may be performed by one or more hardware processors configured by machine-readable instructions including a component that is the same as or similar to transcript storing component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide presence of modifications in user dictation, the system comprising:
one or more processors configured by machine-readable instructions to:
obtain, from a client computing platform, primary audio information representing sound for a speech from a recording user;
perform speech recognition on the primary audio information such that a transcript representing the speech is generated;
effectuate, via the client computing platform, presentation of the transcript to the recording user;
receive, via the client computing platform, user input from the recording user, the user input from the recording user including instructions to alter a portion of the transcript;
alter, based on the received user input from the recording user, the portion of the transcript to generate an altered transcript;
effectuate, via a reviewing interface on a second client computing platform, presentation of the altered transcript in conjunction with audio playback of at least some of the primary audio information, wherein presentation of the altered transcript in the reviewing interface includes visually indicating the portion of the altered transcript; and
receive, via the reviewing interface from the reviewing user, secondary user input including instructions to further alter one or more portions of the altered transcript;

alter, based on the secondary user input, the one or more portions of the altered transcript to generate a reviewed transcript; and store the reviewed transcript in electronic storage media.

2. The system of claim 1, wherein the user input from the recording user that causes generation of the altered transcript includes alternative audio information representing sound for re-dictated speech captured by the client computing platform.

3. The system of claim 1, wherein the user input from the recording user that causes generation of the altered transcript includes textual input to the client computing platform by the recording user.

4. The system of claim 2, wherein the one or more processors are further configured by machine-readable instructions to:

replace the portion of the primary audio information that is represented by the portion of the transcript with the alternative audio information to generate secondary audio information, wherein the secondary audio information includes intertwined portions of the primary audio information and the alternative audio information such that the secondary audio information audibly reflects modifications made by the recording user, wherein the audio playback includes the secondary audio information.

5. The system of claim 1, wherein the one or more processors are further configured by machine-readable instructions to:

effectuate, via the reviewing interface, presentation of the altered transcript in conjunction with audio playback of the primary audio information.

6. The system of claim 3, wherein the one or more processors are further configured by machine-readable instructions to:

perform speech synthesis on the textual input received from the recording user to generate synthetic audio information that represents the textual input from the recording user;

replace the portion of the primary audio information that is represented by the portion of the transcript with the synthetic audio information to generate secondary audio information, wherein the secondary audio information includes intertwined portions of the primary audio information and the synthetic audio information to audibly reflect modifications made by the recording user, wherein the audio playback includes the secondary audio information.

7. The system of claim 1, wherein receiving, via the reviewing interface, the secondary user input includes receiving textual input, and wherein the reviewing interface does not facilitate auditory input by the reviewing user.

8. The system of claim 1, wherein the one or more processors are further configured by machine-readable instructions to:

effectuate, via the client computing platform, presentation of the reviewed transcript to the recording user.

9. The system of claim 1, wherein the corrected portion of the transcript is visually indicated by one or more of highlight, bold, italics, color, strikethrough, and/or underline.

10. The system of claim 1, wherein the client computing platform includes an audio section including one or more of a microphone, an audio encoder, a storage, a speaker, and/or a processor.

11. A method for providing presence of modifications in user dictation, the method comprising:

obtaining, from a client computing platform, primary audio information representing sound for a speech from a recording user;

performing speech recognition on the primary audio information such that a transcript representing the is generated;

effectuating, via the client computing platform, presentation of the transcript to the recording user;

receiving, via the client computing platform, user input from the recording user, the user input from the recording user including instructions to alter a portion of the transcript;

altering, based on the received user input from the recording user, the portion of the transcript to generate an altered transcript;

effectuating, via a reviewing interface on a second client computing platform, presentation of the altered transcript in conjunction with audio playback of at least some of the primary audio information, wherein presentation of the altered transcript in the reviewing interface includes visually indicating the portion of the altered transcript; and receiving, via the reviewing interface from the reviewing user, secondary user input including instructions to further alter one or more portions of the altered transcript;

altering, based on the secondary user input, the one or more portions of the altered transcript to generate a reviewed transcript; and storing the reviewed transcript in electronic storage media.

12. The method of claim 11, wherein the user input from the recording user that causes generation of the altered transcript includes alternative audio information representing sound for re-dictated speech captured by the client computing platform.

13. The method of claim 12, further including:

replacing the portion of the primary audio information that is represented by the portion of the transcript with the alternative audio information to generate secondary audio information, wherein the secondary audio information includes intertwined portions of the primary audio information and the alternative audio information such that the secondary audio information audibly reflects modifications made by the recording user, wherein the audio playback includes the secondary audio information.

14. The method of claim 11, wherein the user input from the recording user that causes generation of the altered transcript includes textual input to the client computing platform by the recording user.

15. The method of claim 14, further including:

performing speech synthesis on the textual input received from the recording user to generate synthetic audio information that represents the textual input from the recording user;

replacing the portion of the primary audio information that is represented by the portion of the transcript with the synthetic audio information to generate secondary audio information, wherein the secondary audio information includes intertwined portions of the primary audio information and the synthetic audio information to audibly reflect modifications made by the recording user, wherein the audio playback includes the secondary audio information.

16. The method of claim 11, further including:
effectuating, via the reviewing interface, presentation of the altered transcript in conjunction with audio playback of the primary audio information.

17. The method of claim 11, wherein receiving, via the reviewing interface, the secondary user input includes receiving textual input, and wherein the reviewing interface does not facilitate auditory input by the reviewing user.

18. The method of claim 11, further including:
effectuating, via the client computing platform, presentation of the reviewed transcript to the recording user.

19. The method of claim 11, wherein the corrected portion of the transcript is visually indicated by one or more of highlight, bold, italics, color, strikethrough, and/or underline.

20. The method of claim 11, wherein the client computing platform includes an audio section including one or more of a microphone, an audio encoder, a storage, a speaker, and/or a processor.

\* \* \* \* \*